(12) United States Patent
Chen

(10) Patent No.: US 12,550,285 B2
(45) Date of Patent: Feb. 10, 2026

(54) SLIDING TOP PANEL FOR A SERVER RACK

(71) Applicant: DELL PRODUCTS L.P., Round Rock, TX (US)

(72) Inventor: Yi-Hsuan Chen, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 441 days.

(21) Appl. No.: 18/324,620

(22) Filed: May 26, 2023

(65) Prior Publication Data
US 2024/0397656 A1  Nov. 28, 2024

(51) Int. Cl.
*H05K 7/14*  (2006.01)

(52) U.S. Cl.
CPC .................. *H05K 7/1489* (2013.01)

(58) Field of Classification Search
None
See application file for complete search history.

(56) References Cited

U.S. PATENT DOCUMENTS

| | | | |
|---|---|---|---|
| 10,477,719 B1* | 11/2019 | An | H05K 7/1487 |
| 11,083,102 B1* | 8/2021 | Darche | H02B 1/013 |
| 2004/0231875 A1* | 11/2004 | Rasmussen | H05K 7/1497 |
| | | | 174/50 |
| 2009/0260874 A1* | 10/2009 | Eckberg | H05K 7/1491 |
| | | | 174/650 |
| 2015/0189787 A1 | 7/2015 | Bailey et al. | |
| 2018/0192537 A1* | 7/2018 | Gray | H05K 7/1497 |
| 2019/0021178 A1* | 1/2019 | Zumbek | H05K 7/18 |
| 2023/0126299 A1 | 4/2023 | Doglio et al. | |

* cited by examiner

*Primary Examiner* — Allen L Parker
*Assistant Examiner* — Christopher L Augustin
(74) *Attorney, Agent, or Firm* — Larson Newman, LLP

(57) ABSTRACT

A server rack includes a frame and a top panel. The frame includes a top frame structure and holds multiple information handling systems. The top panel includes a main portion and a sliding portion. The main portion is secured in a fixed location on the top frame structure. The sliding portion is adjustably coupled to a first edge of the main portion. The sliding portion transitions between a closed portion and an open position. A space between the sliding portion and an outer edge of the top frame structure is larger when the sliding portion is in the open position as compared to when the sliding portion is in the closed position.

20 Claims, 5 Drawing Sheets

SLIDING TOP PANEL FOR A SERVER RACK

FIELD OF THE DISCLOSURE

The present disclosure generally relates to information handling systems, and more particularly relates to a sliding top panel for a server rack.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A server rack includes a frame and a top panel. The frame includes a top frame structure and may hold multiple information handling systems. The top panel includes a main portion and a sliding portion. The main portion may be secured in a fixed location on the top frame structure. The sliding portion may be adjustably coupled to a first edge of the main portion. The sliding portion may transition between a closed portion and an open position. A space between the sliding portion of an outer edge of the top frame structure may be larger when the sliding portion is in the open position as compared to when the sliding portion is in the closed position.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
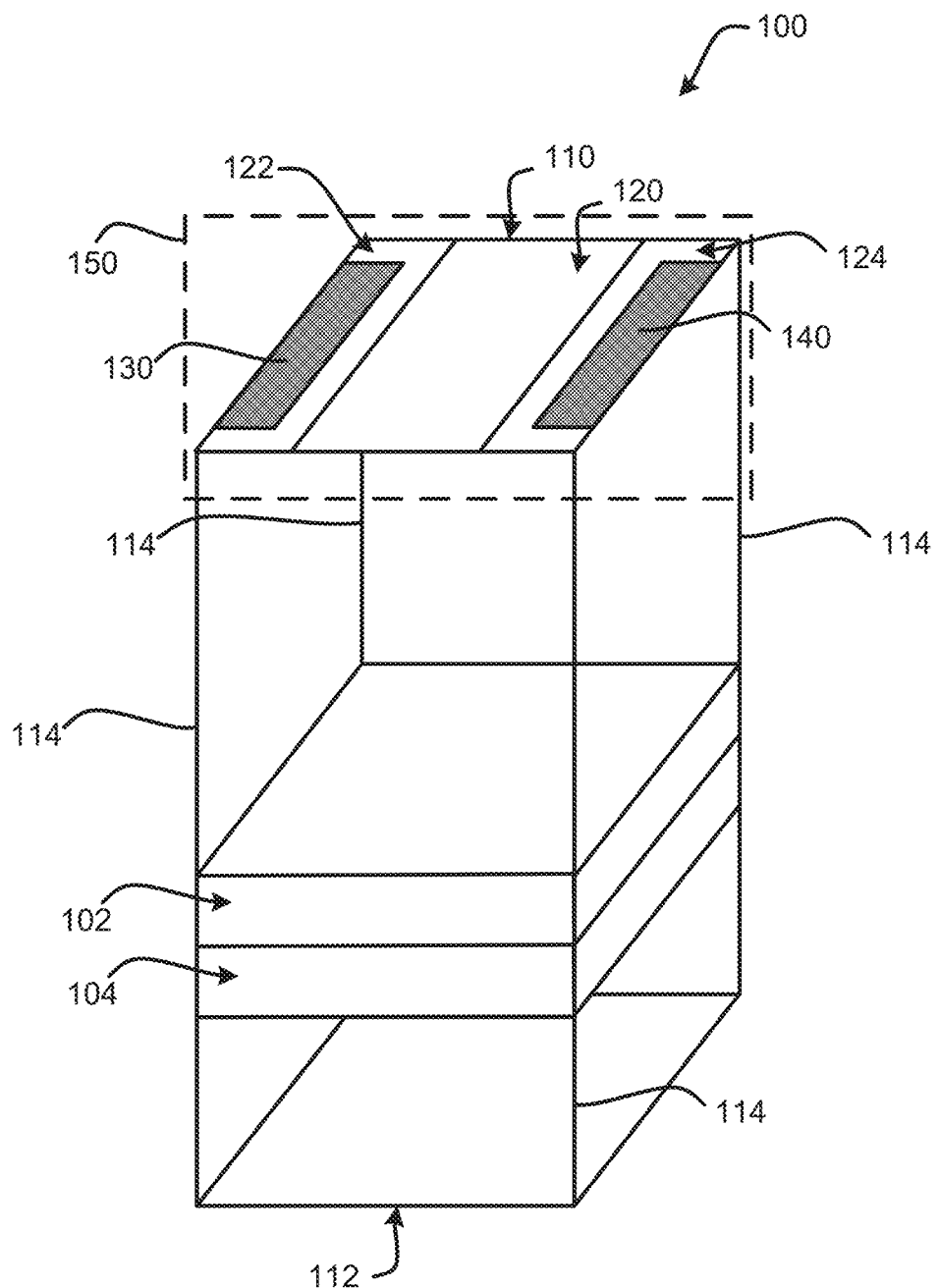
FIG. 1 is a block perspective view of a server rack including multiple information handling systems according to at least one embodiment of the present disclosure.

FIG. 1 illustrates a server rack 100 that holds multiple information handling systems 102 and 104 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Server rack 100 includes a top panel 102, a bottom panel 114, and a frame 114. In an example, frame 114 includes multiple support structures that information handling systems 102 and 104 may be in physical communication with and secured to in any suitable manner. In certain examples, information handling systems 102 and 104 may be secured to the support structures of frame 114 via rails or the like. Top panel 110 includes a main portion 120 and sliding portions 122 and 124. Sliding portion 122 includes a brush component 130 and sliding portion 124 includes a brush component 140. In certain examples, brush components 130 and 140 may enable one or more cable pipes to be inserted within server rack 100 as will be described below. Server rack 100 may include any additional components without varying from the scope of this disclosure. A portion 150 of server rack 100 will be described with respect to FIG. 2.

Figure 2:
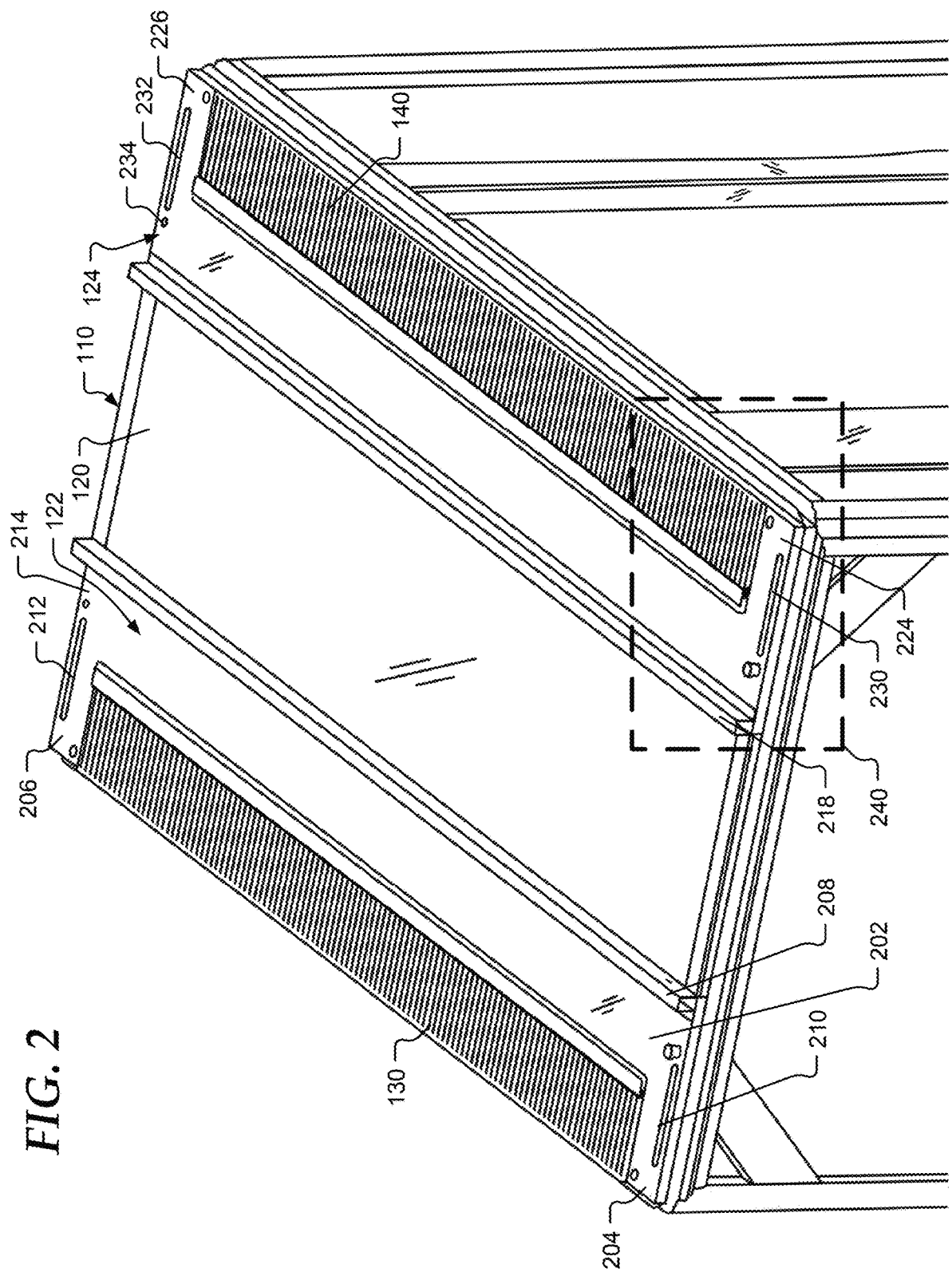
FIG. 2 is a perspective view of a portion of a top of a server rack according to at least one embodiment of the present disclosure.

FIG. 2 illustrates a portion 150 of server rack 100 of FIG. 1 according to at least one embodiment of the present disclosure. Sliding portion 122 includes a support portion 202, extension portions 204 and 206, a push/pull component 208, channels 210 and 212, a locking hole 214, and brush component 130. In an example, sliding portion 122 may include additional components without varying from the scope of this disclosure. Sliding portion 124 includes a support portion 222, extension portions 224 and 226, a push/pull component 228, channels 230 and 232, a locking hole 234, and brush component 140. In an example, sliding portion 124 may include additional components without varying from the scope of this disclosure.

In certain examples, main portion 120 of top panel 110 may be located substantially in the center of the top panel and sliding portions 122 and 124 may be located on the edges of the top panel. In an example, main portion 120 may be secured to frame 114 of FIG. 1, such that the main portion does not move within respect to the other components of server rack 100 of FIG. 1. Sliding portions 122 and 124 may be in physical communication with main portion 120 and may transition from a closed position to an open position. In an example, each of sliding portions 122 and 124 may transition from the closed portion to the open position independent of each other, such that one of the sliding portions may be in the open position and the other sliding portion may be in the closed position. In certain examples, locking hole 214 may be utilized to lock sliding portion 122 in the closed position, and locking hole 234 may be utilized to lock sliding portion 124 in the closed position.

In an example, both support portion 202 of sliding portion 122 and support portion 222 of sliding portion 124 may extend the length of top panel 110. As shown in FIG. 2, a length of sliding portions 122 and 124 may be defined with respect to a longer dimension of server rack 100. However, the length of sliding portions 122 and 124 may be defined with respect to a shorter dimension of server rack 100 without varying from the scope of this disclosure.

In an example, extension portion 204 may extend from one end of support portion 202 and extension portion 206 may extend from another end of the support portion that is distal from the end connected to extension portion 204. As used herein, distal refers to an end of a component that is farthest from another end of the component. In certain examples, extension portions 204 and 206 may create a recess within sliding portion 122, and the recess may be from one of the extension portions to the other and a depth of the recess may be from support portion 202 to respective distal ends of the extension portions. In an example, brush component 130 may be in physical communication with support portion 202 and extension portions 204 and 206 and may be located within the recess of sliding portion 122 formed by the extension portions. Channels 210 and 212 may be located at the distal ends of support portion 202 and may be utilized in enabling sliding portion 122 to transition between the closed and open positions.

In an example, extension portion 224 may extend from one end of support portion 222 and extension portion 226 may extend from another end of the support portion that is distal from the end connected to extension portion 224. In certain examples, extension portions 224 and 226 may create a recess within sliding portion 124, and the recess may be from one of the extension portions to the other and a depth of the recess may be from support portion 222 to respective distal ends of the extension portions. In an example, brush component 140 may be in physical communication with support portion 222 and extension portions 224 and 226 and may be located within the recess of sliding portion 124 formed by the extension portions. Channels 230 and 232 may be located at the distal ends of support portion 222 and may be utilized in enabling sliding portion 124 to transition between the closed and open positions. A portion 240 of server rack 100 will be described with respect to FIG. 3.

Figure 3:
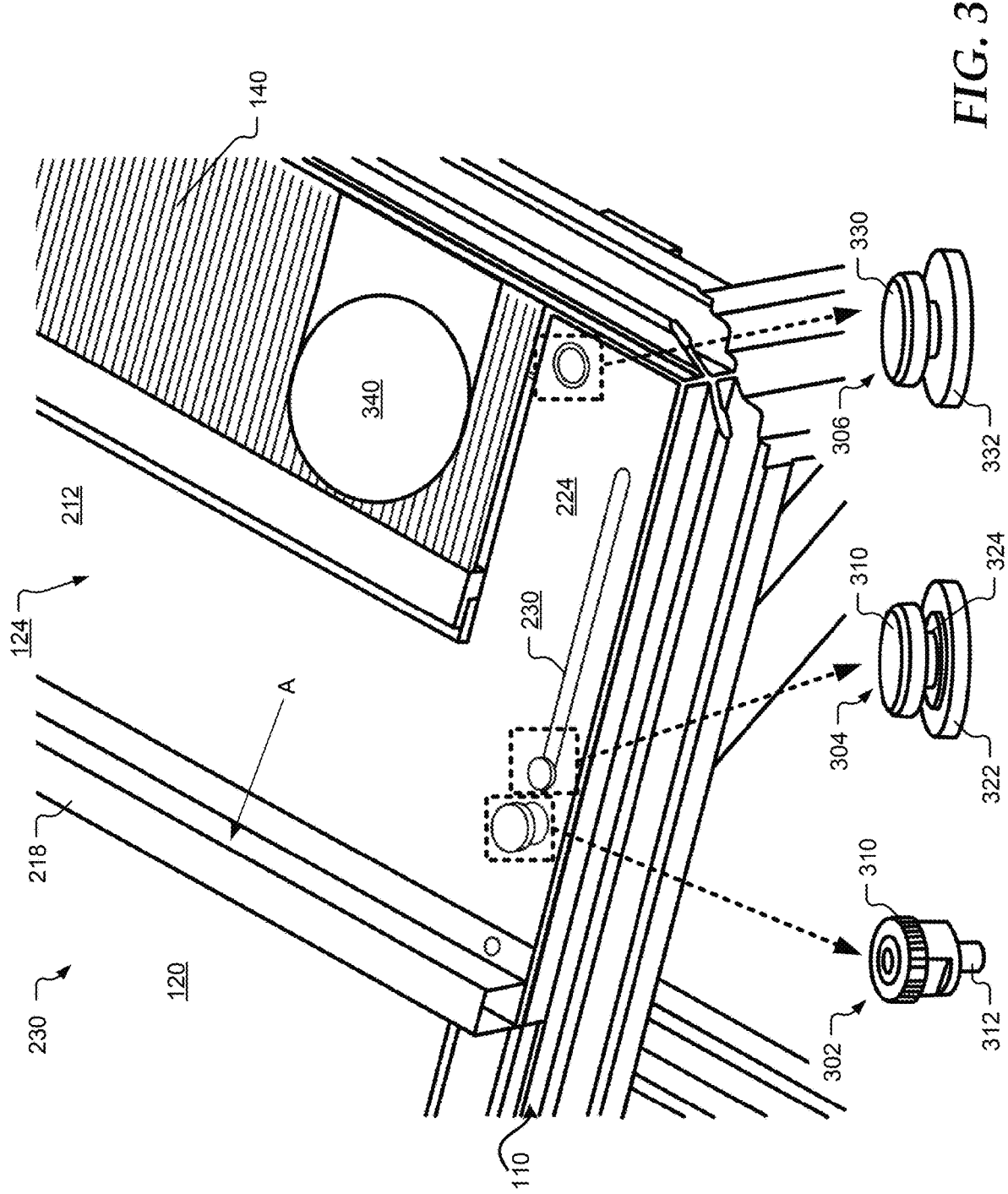
FIG. 3 is a perspective view of a portion of a top panel of a server rack according to at least one embodiment of the present disclosure.

FIG. 3 illustrates portion 240 of top panel 110 of server rack 100 according to at least one embodiment of the present disclosure. As illustrated in FIG. 3, server rack 100 includes a plunger 302, a spool component 304, and a connection component 306. Plunger 302 includes a thumb screw portion 310 and an insert portion 312. Spool component 304 includes a spool thread 320, a spool nut 322 and a neck 324. Connection component 306 includes portions 330 and 332. In an example, when sliding component 124 is in the closed position, a cable pipe 340 may be inserted through brush component 140 and into server rack 100. Brush component 140 may include multiple bristles that may be individually bent. Some of the bristles of brush component 140 may bend to enable cable pipe 340 to be inserted into server rack 100 and the remaining bristles may remain rigid to prevent dust from entering the server rack. In an example, cable pipe 340 may have a diameter that is less than a width of brush component 140 and the recess of sliding portion 124.

In an example, plunger 302 may be utilized to lock sliding portion 124 in the closed position. For example, insert portion 312 may be inserted through sliding portion 212 and into main portion 120. In certain examples, insert portion 312 may be inserted through a locking hole of sliding portion 124, such as locking hole 214 or 234 of FIG. 2, and into a corresponding hole of main portion 120. An individual associated with server rack 100 may pull up on thumb screw portion 310 of plunger 302 to remove insert portion 312 from within main portion 120 and sliding portion 124. When insert portion 312 is not within main portion 120 and sliding portion 124, sliding portion 124 may transition from the closed position to the open position.

In certain examples, spool component 304 may be in physical communication with both main portion 120 and sliding portion 124. For example, spool nut 322 may be secured within main portion 120, such that the spool component 304 does not move while sliding portion 124 transitions from the closed position to the open position. In an example, spool thread 320 of the spool component 304 may be in physical communication with a top surface of sliding portion 124 of top panel 110 and channel 220 may slide along neck 324 while the sliding portion transition between the closed and open positions. When sliding portion 124 is in the closed position, spool components 304 may be in physical communication with one end of channel 220.

In an example, an individual may exert a force on push/pull component 218 in the direction of arrow A. Based on this force, sliding portion 124 may transition from the closed position to the open position. While sliding portion 124 transitions from the closed position to the open position, spool component 304 may slide from one end of channel 220 to the other end of the channel. When spool component 304 is placed in physical communication with the opposite or distal end of channel 220, sliding portion 124 may be in the open position as illustrated in FIG. 4.

While sliding portion 124 transitions from the closed position to the open position, connection component 306 may hold the sliding portion in physical communication with main portion 120. In an example, portion 330 of connection component 306 may be secured within extension portion 214 of sliding portion 124 and portion 332 may be in physical communication with a bottom surface of main portion 120. As shown in FIG. 3, portion 332 of connection component 306 may have a larger diameter than portion 330 so that portion 332 may overlap a substantial amount of the bottom surface of main portion 120. Connection component 306 may have a particular distance or space between portions 330 and 332 so that portion 330 may be secured within sliding portion 124 and a top surface of portion 332 may be in physical communication with a bottom surface of main portion 120. While sliding portion 124 transitions from the closed position to the open position, connection component 306 may prevent the sliding portion from tilting away from main portion 120 and frame 114 of server rack 100.

Figure 4:
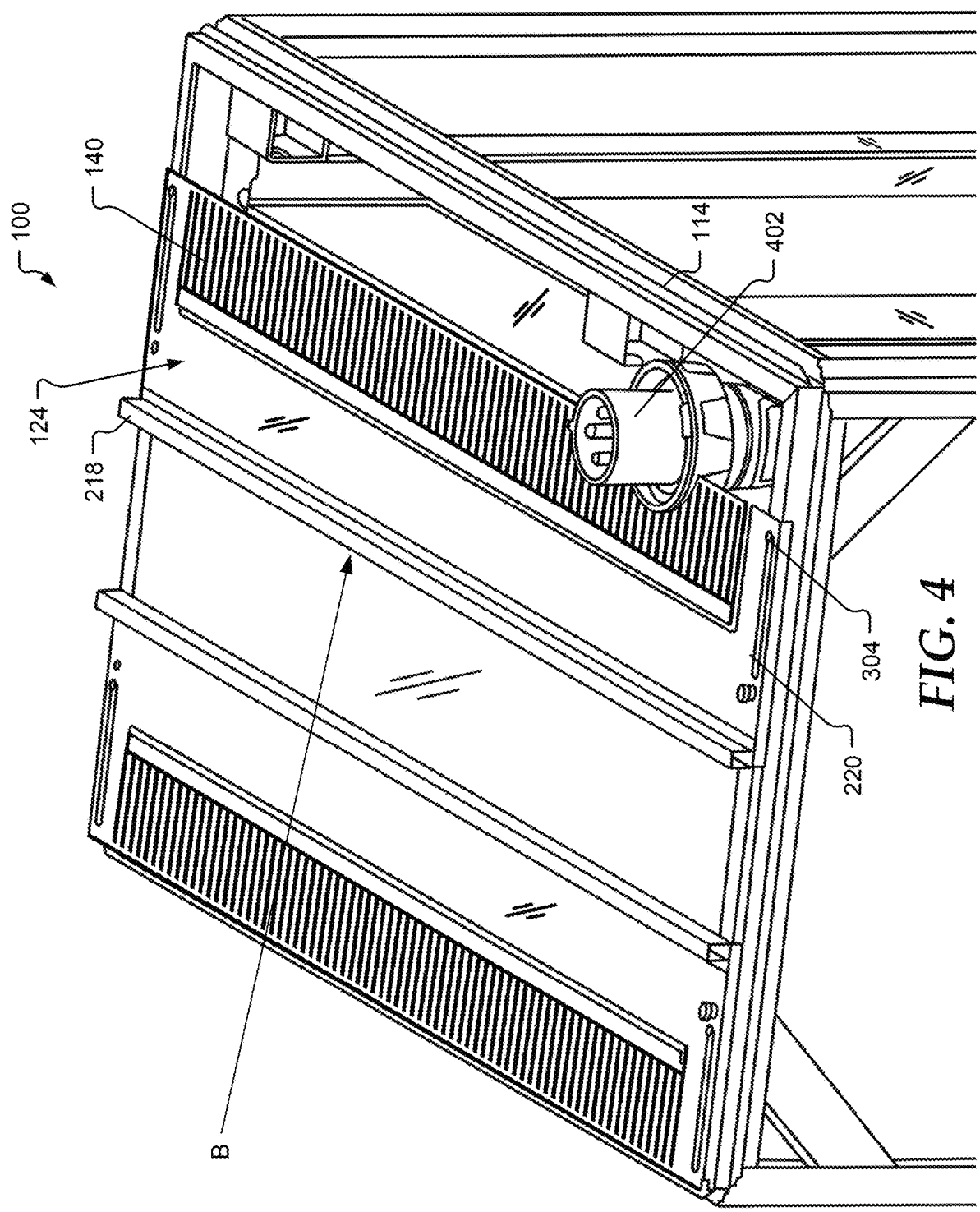
FIG. 4 is a perspective view of a top portion of a server rack according to at least one embodiment of the present disclosure.

Referring now to FIG. 4, when sliding portion 124 is in the open position, a cable pipe 402 may be inserted between the sliding portion and frame 114 of server rack 100 and into the server rack. In an example, when sliding component 124 is in the open position, a larger distance or space may be between the sliding component and frame 114 as compared to when the sliding portion is in the closed position. Some of the bristles of brush component 140 may bend to enable cable pipe 402 to be inserted into server rack 100 and the remaining bristles may remain rigid to prevent dust from entering the server rack. In an example, cable pipe 402 may have a diameter that is greater than the diameter of cable pipe 340 of FIG. 3. In an example, cable pipe 402 may be removed from within server rack 100, and a force may be exerted on push/pull component 218 in the direction of arrow B. Based on the force in the direction of arrow B, sliding portion 124 may transition from the open position to the closed position.

Figure 5:
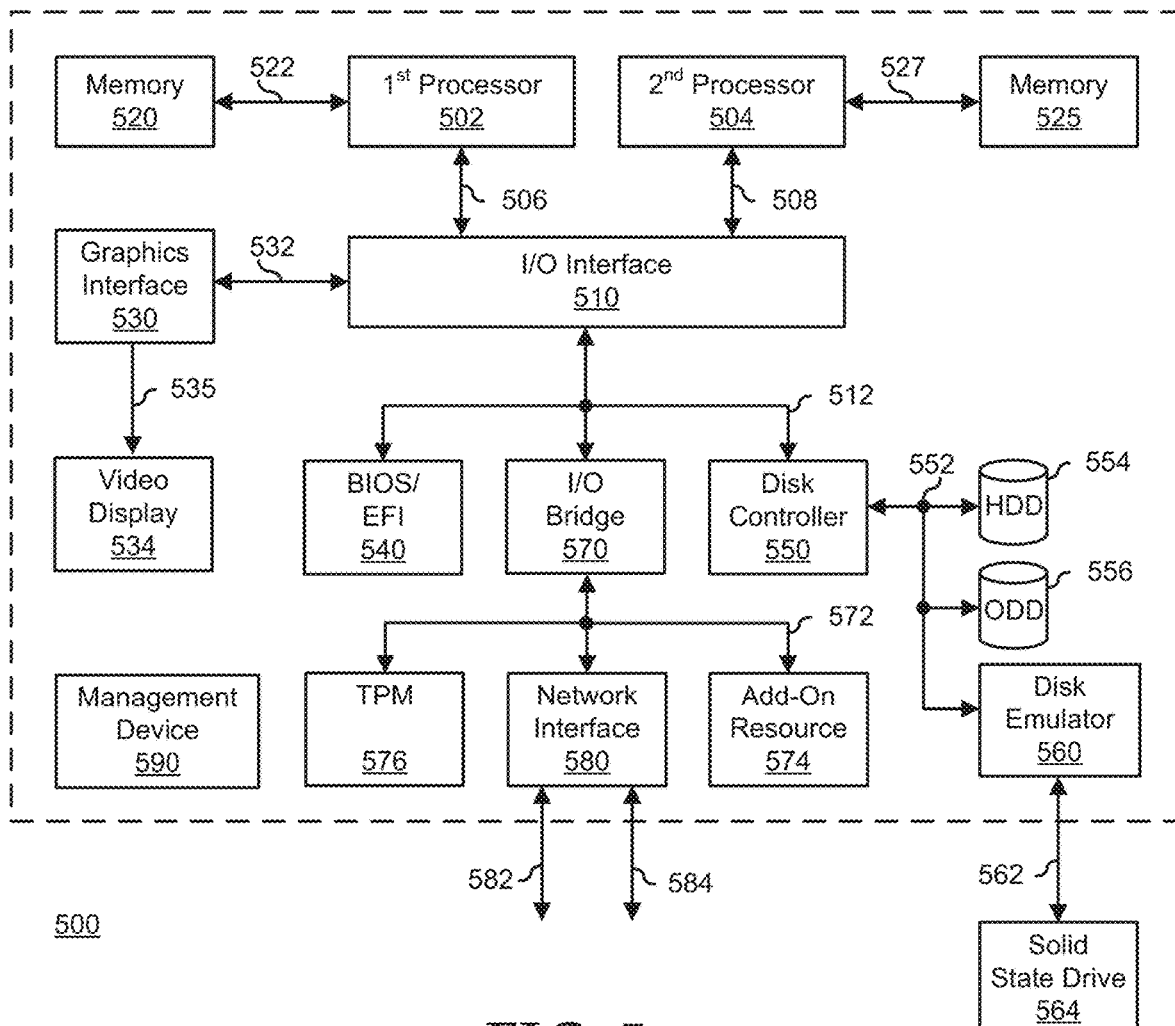
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 5394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A server rack comprising:
 a frame to hold a plurality of information handling systems, wherein the frame includes a top frame structure; and
 a top panel in physical communication with the top frame structure of the frame, the top panel including:
  a main portion secured in a fixed location on the top frame structure; and
  a sliding portion in physical communication with the main portion, the sliding portion adjustably coupled to a first edge of the main portion, the sliding portion configured to transition between a closed portion and an open position, wherein a space between the sliding portion and an outer edge of the top frame structure is larger when the sliding portion is in the open position as compared to when the sliding portion is in the closed position.

2. The server rack of claim 1, further comprising: a plunger with an insert portion to be inserted through both the sliding portion and the main portion to lock the sliding portion in either the closed position or the open position.

3. The server rack of claim 2, wherein the plunger locks the sliding portion in the closed position when the insert portion is inserted through a first hole of the main portion.

4. The server rack of claim 3, wherein the plunger locks the sliding portion in the open position when the insert portion is inserted through a second hole of the main portion.

5. The server rack of claim 2, wherein the sliding portion is unlocked when the insert portion is removed from the sliding portion and the main portion.

6. The server rack of claim 1, further comprising:
 a spool component including a spool nut secured to the main portion, and a spool thread portion, wherein the sliding portion includes a channel in physical communication with the spool nut, wherein a top surface of the channel is in physical communication with the spool thread and a bottom surface of the channel is in physical communication with the spool nut.

7. The server rack of claim 6, wherein the sliding portion further includes: a brush component to prevent dust from entering the server rack and enable a first cable pipe to be inserted within the server rack when the sliding portion is the closed position, wherein a second cable pipe is able to be inserted within the server rack when the sliding portion is the open position.

8. The server rack of claim 1, further comprising: a connection component, wherein the connection component includes a first portion securely connected to the sliding portion, and a second portion in physical communication with the main portion.

9. A server rack comprising:
an information handling system; and
a server rack configured to hold the information handling system, the server rack including:
 a frame to hold a plurality of information handling systems, wherein the frame includes a top frame structure; and
 a top panel in physical communication with the top frame structure of the frame, the top panel including:
  a main portion secured in a fixed location on the top frame structure; and
  a sliding portion in physical communication with the main portion, the sliding portion adjustably coupled to a first edge of the main portion, the sliding portion configured to transition between a closed portion and an open position, wherein a space between the sliding portion and an outer edge of the top frame structure is larger when the sliding portion is in the open position as compared to when the sliding portion is in the closed position.

10. The server rack of claim 9, wherein the server rack further includes: a plunger with an insert portion to be inserted through both the sliding portion and the main portion to lock the sliding portion in either the closed position or the open position.

11. The server rack of claim 10, wherein the plunger locks the sliding portion in the closed position when the insert portion is inserted through a first hole of the main portion.

12. The server rack of claim 11, wherein the plunger locks the sliding portion in the open position when the insert portion is inserted through a second hole of the main portion.

13. The server rack of claim 10, wherein the sliding portion is unlocked when the insert portion is removed from the sliding portion and the main portion.

14. The server rack of claim 10, wherein the server rack further includes a spool component including a spool nut secured to the main portion, and a spool thread portion, wherein the sliding portion includes a channel in physical communication with the spool nut, wherein a top surface of the channel is in physical communication with the spool thread and a bottom surface of the channel is in physical communication with the spool nut.

15. The server rack of claim 14, wherein the sliding portion further includes a brush component to prevent dust from entering the server rack and enable a first cable pipe to be inserted within the server rack when the sliding portion is the closed position, wherein a second cable pipe is able to be inserted within the server rack when the sliding portion is the open position.

16. The server rack of claim 15, wherein the server rack further includes a connection component, wherein the connection component includes a first portion securely connected to the sliding portion, and a second portion in physical communication with the main portion.

17. A server rack comprising:
 a frame to hold a plurality of information handling systems, wherein the frame includes a top frame structure;
 a top panel in physical communication with the top frame structure of the frame, the top panel including:
  a main portion secured in a fixed location on the top frame structure; and
  a sliding portion in physical communication with the main portion, the sliding portion adjustably coupled to a first edge of the main portion, the sliding portion configured to transition between a closed portion and an open position, wherein a space between the sliding portion and an outer edge of the top frame structure is larger when the sliding portion is in the open position as compared to when the sliding portion is in the closed position;
 a plunger with an insert portion to be inserted through both the sliding portion and the main portion to lock the sliding portion in either the closed position or the open position; and
 a spool component including a spool nut secured to the main portion, and a spool thread portion, wherein the sliding portion includes a channel in physical communication with the spool nut, and a top surface of the channel is in physical communication with the spool thread and a bottom surface of the channel is in physical communication with the spool nut.

18. The server rack of claim 17, wherein the plunger locks the sliding portion in the closed position when the insert portion is inserted through a first hole of the main portion.

19. The server rack of claim 17, wherein the plunger locks the sliding portion in the open position when the insert portion is inserted through a second hole of the main portion.

20. The server rack of claim 17, wherein the sliding portion is unlocked when the insert portion is removed from the sliding portion and the main portion.

\* \* \* \* \*